April 24, 1945. N. M. OLNEY 2,374,376
MATERIAL WORKING APPARATUS
Filed March 31, 1944 2 Sheets-Sheet 1

INVENTOR
N. M. OLNEY
BY
E. R. Nowlan
ATTORNEY

April 24, 1945.  N. M. OLNEY  2,374,376
MATERIAL WORKING APPARATUS
Filed March 31, 1944  2 Sheets-Sheet 2
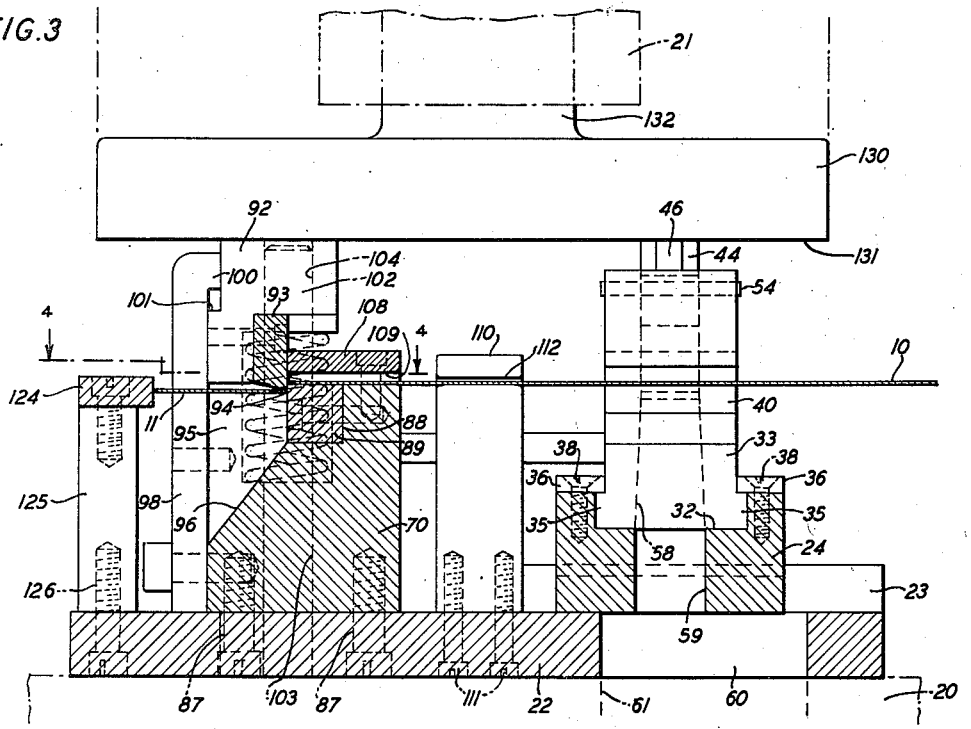
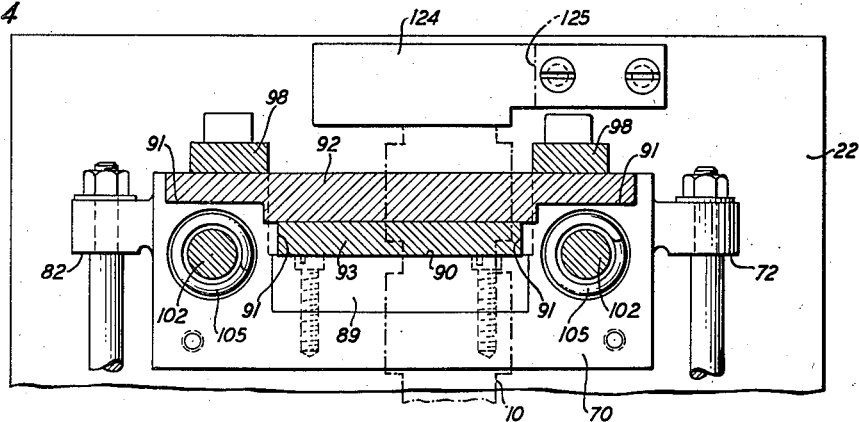
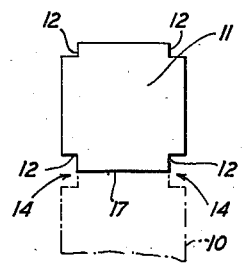
INVENTOR
N. M. OLNEY
BY
E. R. Nowlan
ATTORNEY Patented Apr. 24, 1945

2,374,376

UNITED STATES PATENT OFFICE 2,374,376

MATERIAL WORKING APPARATUS

Nathaniel M. Olney, New York, N. Y., assignor to Western Electric Company, Incorporated, New York, N. Y., a corporation of New York Application March 31, 1944, Serial No. 528,854

6 Claims. (Cl. 164—15)

This invention relates to material working apparatus, and more particularly to apparatus for punching and shearing articles from sheet material.

An object of the invention is to provide a material working apparatus which is simple in structure and highly variable, to perform work on materials of various sizes.

With this and other objects in view, the invention comprises a material working apparatus including material working units disposed at selected variable positions relative to each other and actuable by a reciprocable head to perform work on a material.

Other objects and advantages will be apparent from the following detailed description when considered in conjunction with the accompanying drawings, wherein Fig. 1 is a top plan view of the apparatus, with the actuating head removed;

Fig. 3 is a longitudinal sectional view taken along the line 3—3 of Fig. 1, showing also the reciprocable head;

Fig. 4 is a fragmentary sectional view taken substantially along the line 4—4 of Fig. 3, and Fig. 5 is a top plan view of the article resulting from the operation of the units of the apparatus.

Figure 1:
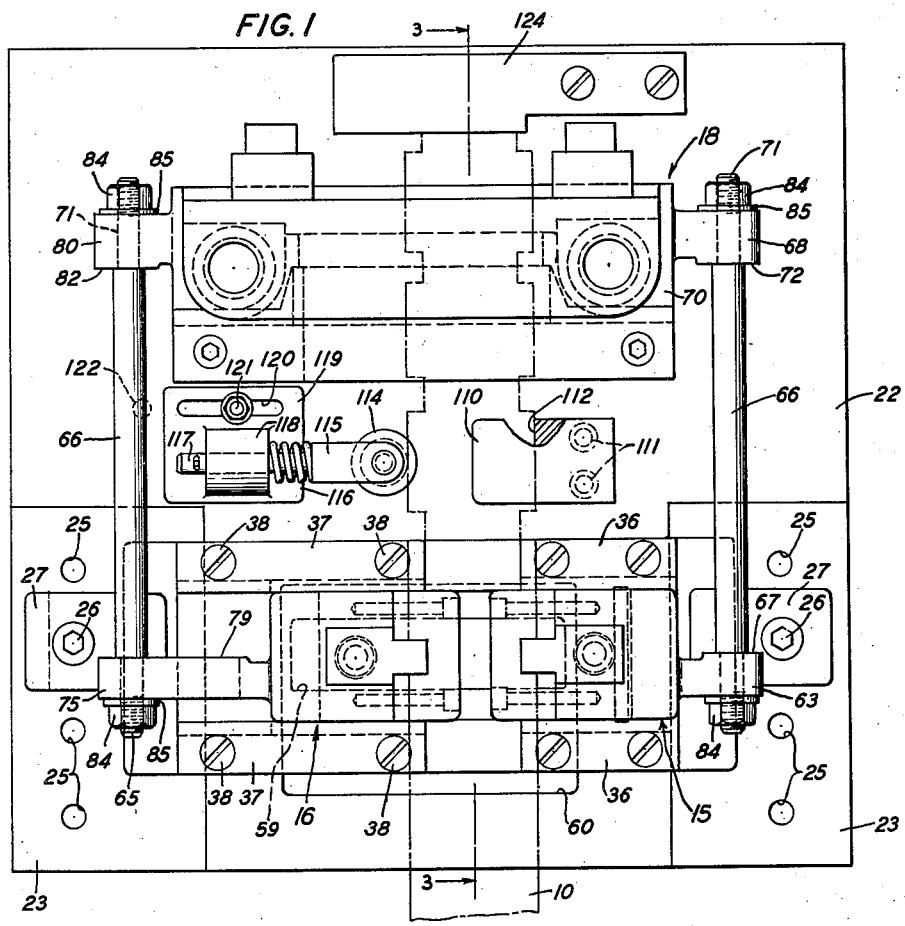

Referring now to the drawings, attention is first directed to the material 10 and the operations to be performed thereon to produce an article 11 (Fig. 5). In the present instance the material 10 may be of any suitable type, for example, sheet metal, from which the article 11 is to be formed with notched corners 12. Notches, indicated generally at 14, twice the length of the notches 12 are to be cut simultaneously in the material 10 at opposed positions by the aid of units indicated generally at 15 and 16. After the forming of the notches 14 in the material, the material is severed along a line 17 midway of the notches 14 through the aid of a shearing unit indicated generally at 18.

Considering now the specific details of the apparatus, let it be understood that only those features necessary to illustrate the invention have been completely disclosed. In other words, the apparatus includes a table 20 and a ram 21, the latter being reciprocable relative to the table by suitable means (not shown). A base 22 is mounted upon the table 20 in any suitable manner (not shown) and has spaced vertically projecting members 23 which serve as guides for a support 24 for the units 15 and 16. A plurality of aligned apertures 25 is formed in each of the members 23 to receive screws 26 of clamps 27, so that the clamps may be disposed at any of the various positions through the aid of the threaded apertures 25. The clamps 27 are of the contours shown, with beaded portions 28 about which they may rock through the force of their screws 26 into clamping engagement with their respective flanges 30, of the support 24, which extend over and rest on the members 23. The support 24 has a longitudinal groove 32 in the upper surface thereof to receive bodies 33 and 34 of the units 15 and 16. The lower portions of the bodies 33 and 34, which are disposed in the groove 32, has laterally projecting flange portions 35 which retaining plates 36, for the body 33, and retaining plates 37, for the body 34, may engage to hold their respective units in selected positions, through the aid of screws 38. In the present instance the unit 15 is fixed on the support 24, while the unit 16 is adjustable relative thereto.

Figure 2:
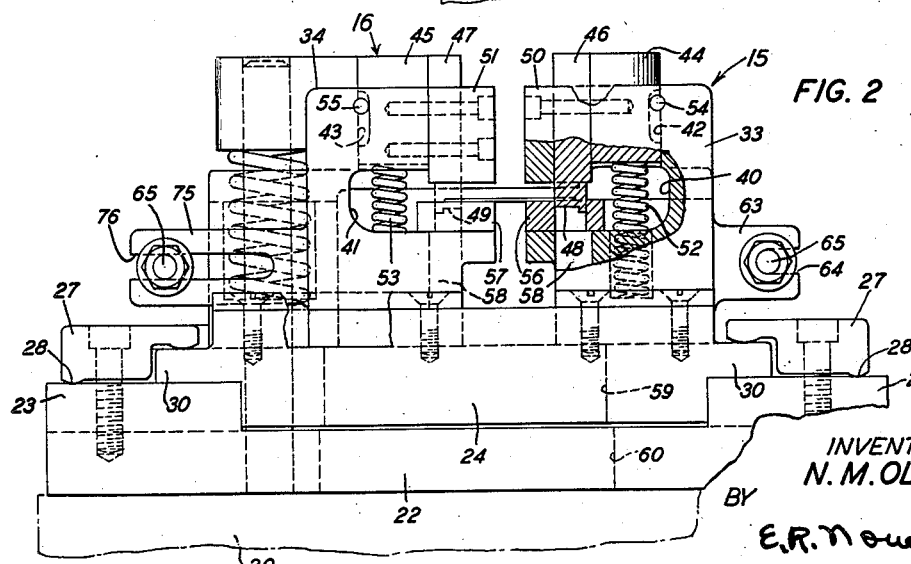
Fig. 2 is an end elevational view of the structure shown in Fig. 1, illustrating the material working units in their operated positions.

The units 15 and 16 are substantially identical in structure, their bodies 33 and 34 having cutaway portions or throats 40 and 41, and apertures 42 and 43 therein, the latter being adapted to receive their tool supports 44 and 45, respectively. Tools 46 and 47, mounted upon or formed integral with the tool supports, are of contours adapted for cutting the notches 14 in the material 10, their lower ends being of the contours illustrated at 48 and 49 in Fig. 2. Retaining members 50 and 51, fixed to the bodies 33 and 34, complete the apertures 42 and 43 and assist in guiding the tools 46 and 47 during their operative movement. Springs 52 and 53 normally urge the tool supports 44 and 45 with their respective tools upwardly into their normal or inoperative positions controlled through the aid of pins 54 and 55, these pins being carried by their respective bodies 33 and 34 and receivable in notches of the tool supports 44 and 45, respectively, as shown in Fig. 2. The elements 46 and 47 are described broadly as tools but, specifically, they function as punches.

Die members 56 and 57 are mounted on their respective bodies 33 and 34 beneath the tools or punches 46 and 47 and cooperate therewith for the forming of the notches 14 in the material. Apertures 58 in the bodies 33 and 34 are positioned beneath the cavities of the die members 56 and 57 for the escapement of the parts punched from the material. There is also an elongate aperture 59 in the support 24 which communicates with an aperture 60 in the base 22 and a similar aperture 61 in the table 20, as well as with both apertures 58 for the escapement of the punched parts of the material.

The body 33 of the unit 15 is provided with an integral lug or projection 63 notched at 64 to receive a threaded end 65 of a locating element 66. The threaded end 65 is reduced in size from the central portion of the element, providing a shoulder to engage a locating surface 67 of the lug 63. The surface 67 is in a plane with the center lines of the units 15 and 16. A similar lug 68 is integral with a body 70 of the unit 18, to removably receive another reduced threaded end 71 of the element 66, providing a shoulder to engage a locating surface 72, the latter lying in a plane with the cutting edges of the unit 18.

A lug 75, integral with the body 34 and similar in contour to the lug 63 but of greater length, as illustrated in Figs. 1 and 2, is notched, as at 76, to receive the reduced threaded end 65 of another locating element 66. A locating surface 79 of the lug 75 lies in a plane with the surface 67 of the lug 63 to be engaged by the adjacent shoulder of the selected locating element 66. A lug 80, integral with the body 70, is identical in structure with the lug 68 and is adapted to receive a reduced threaded end 71 of the element. A locating surface 82 of the lug 80 lies in a plane with the surface 72 and the shearing edges of the unit 18. Through the aid of nuts 84 and washers 85 disposed upon the reduced threaded ends of the locating elements 66, these elements may be secured in place. In the present embodiment only one set of locating elements is illustrated. These locating elements are identical in structure and are of a given length for the particular material selected and article formed therefrom, as illustrated in the drawings. The unit 18 with its integral lugs is fixed at a given position on the base 22, while the units 15 and 16 are jointly adjustable to positions relative to the unit 18 depending upon the size or width of the material and the relationship or spacing of the notches therein. If the notches are to be disposed smaller distances apart, shorter locating elements will be employed, while if the notches are to be disposed greater distances apart, longer locating elements will be employed. This feature of the invention is believed apparent from this description without the need of a disclosure in the drawings of locating elements of different sizes. Through the aid of the elongate lug 75 of the unit 16, this unit may be moved or adjusted laterally relative to the unit 15, this adjustment depending upon the width of the material.

The unit 18, as previously described, includes the body 70, this body being fixedly mounted, as at 87, upon the base 22, and having a cutaway portion 88 for receiving and supporting a fixed shearing blade 89, a shearing edge 90 of which lies in a plane with the locating surfaces 72 and 82. The body 70 is recessed, as at 91, to receive a support 92 for a shearing blade 93, the latter having a shearing edge 94 cooperating with the shearing edge 90 to shear the material 10. Near the center of the body 70, a cutaway portion 95 with a tapered lower surface 96 permits the articles 11 to drop downwardly and move into a receptacle (not shown), after they have been sheared from the material. Vertical guides 98, fixedly mounted upon the body 70, cooperate therewith in guiding the support 92 during its reciprocable movement, upper ends 100 of the guides projecting laterally, as shown in Fig. 3, to serve as stops for engagement with shoulders 101 of the support, to limit the upward movement thereof. Guide pins 102, mounted in apertures 103 of the body 70 and having their upper ends disposed in aligned apertures 104 of the support 92, further assist in guiding the support in its vertical movement. Compression springs 105, disposed concentric with the pins 102, normally urge the support 92 into its uppermost position limited by the shoulders 101 and the stop portions 100.

A cover member 108 extends longitudinally of the body 70 and is fixed thereto, the major portion of the cover intermediate its ends being spaced from the body, as at 109, to provide a passageway for the material 10 in advancing to the shearing blades. Other guides are also provided for the material between the punching units 15 and 16 and the shearing unit 18. These include a stationary guide 110 mounted upon the base 22, as at 111, and grooved, as at 112, to receive the material 10 and provide a fixed path for the adjacent edge of the material in advancing relative to the units. A grooved roller 114, rotatably supported by a yoke 115, interengages the other edge of the material and, through the force of a spring 116, holds the material in the groove 112 of the guide 110. The yoke 115, through the aid of its pin 117, is movably supported in a bracket 118, a base 119 of which is provided with an elongate aperture 120 so that it may be secured at various positions on the base 22 through the aid of a screw 121. The screw 121 is selectively receivable in threaded apertures 122 of the base 22, only one of which is shown in Fig. 1. A stop 124, mounted upon an upright 125 fixed to the base 22 as at 126, is positioned in the path of the material 10 to stop the advancement of the material after each operating cycle to locate the material relative to the units 15, 16 and 18. If desired, the stop 124 may be adjustably mounted for movement relative to the unit 18 or it may be replaced by stops of varying contours, depending upon the requirements as to the size and contour of the articles to be formed from the material selected.

The adjustability of the units 15 and 16 relative to each other and to the unit 18 has been described. All of these units, irrespective of their positions, will be actuable through the aid of a head 130 having an engaging surface 131 positioned to engage the tool supports 44 and 45, with their tools or punches 46 and 47 of the units 15 and 16, and the support 92 for the shearing blade 93, to actuate all of the units simultaneously. An integral shank 132 of the head 130 is supported in the ram 21 and movable therewith a given distance to bring about the actuation of the units.

During the operation of the apparatus, with the units in the relative positions shown, their operable parts will be moved through an operating cycle during the reciprocating cycle of the head 130, to simultaneously form or punch the notches 14 in the material 10 at one position, while at another position the shearing blades 89 and 93 of the unit 18 will shear the material at the center line of a pair of the notches 14, as illustrated in Fig. 1. This operation may continue repeatedly as long as desired, the material being advanced a limited distance, while the units are in their open positions, controlled in its movement by the guides 110 and 114 as well as the stop 124.

Should it be desired to employ material of a greater width, the unit 16 may be adjusted relative to the unit 15 by loosening the adjacent nut 84 of its element 66, loosening also the screws 38 of the clamping plates 37, freeing the unit 16 for lateral movement on the support 24 relative to the unit 15 until its desired position has been reached. After this has been accomplished, the nut 84 previously described may be tightened and the screws 38 may also be tightened to clamp the unit 16 in place. The units 15 and 16 may also be adjusted relative to the shearing unit 18. This may be accomplished by loosening the clamps 27 and removing the locating elements 66, replacing the latter with locating elements identical in structure excepting of different gaging lengths, depending upon the dimensions of the material to be worked and the preferred location of the notches to be formed therein relative to each other. With the support 24 free to move on the base 22 between the guide members or projections 23, the set of units 15 and 16 may be freely located in the given position by the selection of the locating elements. These locating elements may be inserted in place in the brackets 63—68 and 75—80 and, upon tightening of the nuts thereof, bring the shoulders of the locating elements in intimate engagement with the locating surfaces 67—72 and 79—82, the units 15 and 16 then being accurately located with respect to the unit 18. The clamps 27 may then be tightened upon the flanges or projecting portions 30 of the support 24. If necessary, the clamps may be moved to any one of the other positions determined by the threaded apertures 25.

With this structure it is apparent that the material working units are variable in position relative to each other and movable in groups relative to another unit, namely the shearing unit, to perform work on materials of various sizes; particularly the forming of notches in opposing sides of the material and severing the material at the center line of these notches.

Although specific improvements of the invention have been shown and described, it will be understood that they are but illustrative and that various modifications may be made therein without departing from the scope and spirit of this invention as defined by the appended claims.

What is claimed is:

1. In a material working apparatus, a punching unit actuable to successively punch portions from a material advanced intermittently, a shearing unit actuable to successively shear given lengths from the material, and a locating element of a given length interposed between the units to locate them at definite relative positions.

2. In a material working apparatus having a table and a ram reciprocable relative thereto, a support mounted on the table, a material working unit, including a tool and a movable holder therefor, disposed at any selected one of a plurality of positions on the support relative to the ram, and an actuating head mounted on the ram free of the unit and having a surface to strike and move the tool holder to thereby cause the tool to perform work on a material regardless of the position of the unit relative to the head.

3. In a material working apparatus having a table and a ram reciprocable relative thereto, a support mounted on the table, a fixed material working unit, including a tool and a movable holder therefor, mounted at a given position on the table relative to the support, a variable material working unit, including a tool and a movable holder therefor, disposed at any selected one of a plurality of positions on the support relative to the ram and fixed unit, and an actuating head mounted on the ram free of the units and having a surface to strike and move the tool holders to thereby cause the tools to perform work on a material regardless of the relative positions of the units.

4. In a material working apparatus having a table and a ram reciprocable relative thereto, a shearing unit mounted at a given position on the table, companion material working units each including a tool and a movable holder therefor, a support for the companion units, means to secure the support at any one of a plurality of positions on the table relative to the shearing unit, means to mount one of the companion units at a given position on the support, and means to secure other companion unit at variable positions toward and away from its companion unit.

5. In a material working apparatus having a table and a ram reciprocable relative thereto, a shearing unit mounted at a given position on the table, companion material working units each including a tool and a movable holder therefor, a support for the companion units, means to secure the support at any one of a plurality of positions on the table relative to the shearing unit, means to mount one of the companion units at a given position on the support, means to secure other companion unit at variable positions toward and away from its companion unit, and an actuating head mounted on the ram free of the units and having a surface to strike and move the tool holders to thereby cause the tools to perform work on a material regardless of the relative positions of the units.

6. In a material working apparatus having a table and a ram reciprocable relative thereto, a shearing unit mounted at a given position on the table, companion material working units each including a tool and a movable holder therefor, a locating element of a given length, separate means carried by the table adjacent the shearing unit and by the support to receive the element and condition the element to locate the support with the companion units a given distance relative to the shearing unit, means to mount one of the companion units at a given position on the support, means to secure the other companion unit at variable positions toward and away from its companion unit, and an actuating head mounted on the ram free of the units and having a surface to strike and move the tool holders to thereby cause the tools to perform work on a material regardless of the relative positions of the units.

NATHANIEL M. OLNEY.